United States Patent
Takagi

(10) Patent No.: US 8,472,788 B2
(45) Date of Patent: Jun. 25, 2013

(54) MOVING IMAGE PROCESSING APPARATUS, MOVING IMAGE PROCESSING METHOD, AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 13/197,082

(22) Filed: Aug. 3, 2011

(65) Prior Publication Data
US 2012/0039581 A1 Feb. 16, 2012

(30) Foreign Application Priority Data
Aug. 10, 2010 (JP) ................................ P2010-179695

(51) Int. Cl.
| | |
|---|---|
| G11B 27/00 | (2006.01) |
| H04N 5/93 | (2006.01) |
| H04N 5/92 | (2006.01) |
| H04N 7/14 | (2006.01) |
| H04N 7/18 | (2006.01) |
| G06K 9/34 | (2006.01) |
| G06K 9/62 | (2006.01) |

(52) U.S. Cl.
USPC ........... 386/278; 386/280; 386/282; 386/283; 386/326; 386/353; 348/14.07; 348/14.03; 348/135; 382/171; 382/224

(58) Field of Classification Search
USPC ................. 386/278, 280, 282, 283, 326, 353; 348/14.07, 14.03, 135; 382/171, 224
See application file for complete search history.

(56) References Cited

U.S. PATENT DOCUMENTS

| | | | |
|---|---|---|---|
| 6,341,168 B1 * | 1/2002 | Nagasaka et al. | 382/107 |
| 2005/0180580 A1 * | 8/2005 | Murabayashi et al. | 381/81 |
| 2007/0112558 A1 | 5/2007 | Kobayashi | |
| 2009/0279840 A1 * | 11/2009 | Kudo et al. | 386/52 |
| 2010/0094782 A1 | 4/2010 | Kobayashi | |
| 2010/0182501 A1 * | 7/2010 | Sato et al. | 348/441 |

FOREIGN PATENT DOCUMENTS

| | | |
|---|---|---|
| JP | 2007 121457 | 5/2007 |
| JP | 2008 123011 | 5/2008 |

\* cited by examiner

*Primary Examiner* — Daquan Zhao
(74) *Attorney, Agent, or Firm* — Frommer Lawrence & Haug LLP; William S. Frommer; Ellen Marcie Emas

(57) ABSTRACT

There is provided a moving image processing apparatus, including a cut transition detection unit configured to detect inter-cut transition from a moving image including a plurality of cuts, a cut grouping unit configured to group the plurality of cuts into cut groups based on a degree of similarity among the cuts, an inter-cut distance calculation unit configured to calculate inter-cut distances based on inter-cut temporal distances in the moving image, an inter-cut group distance calculation unit configured to calculate inter-cut group distances by summing up the inter-cut distances, which are calculated with respect to the plurality of cuts, in each cut group, and a cut structure image generation unit configured to generate a cut structure image including representative images of the cuts belonging to the cut groups and information indicating the inter-cut group distances.

12 Claims, 14 Drawing Sheets

FIG.1
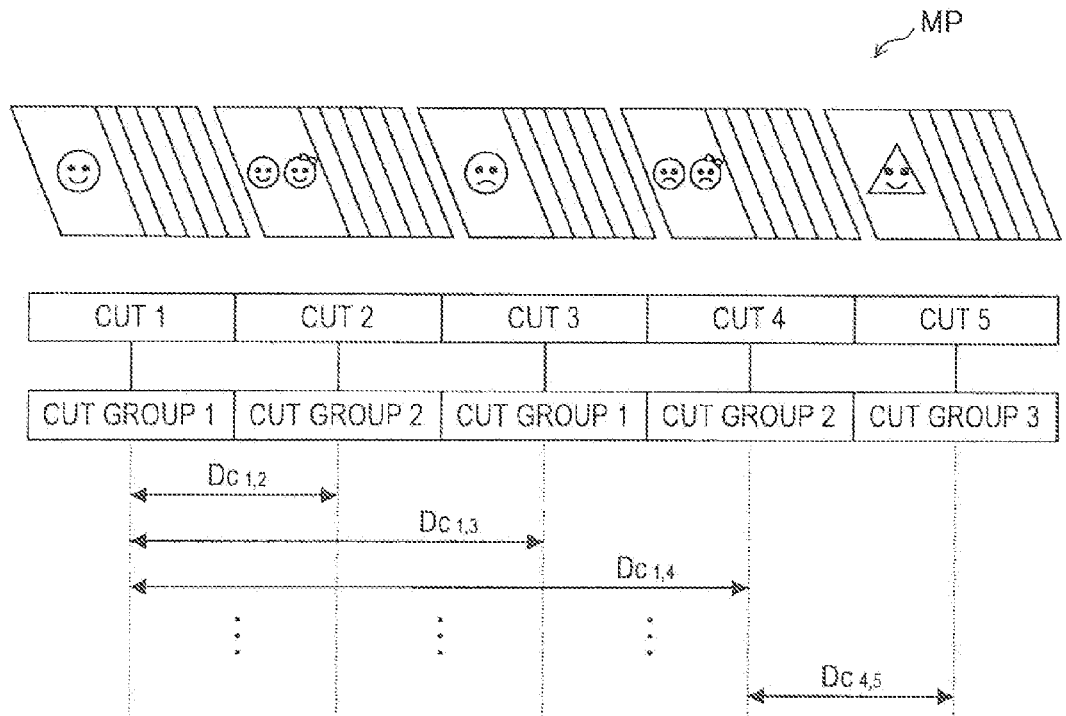
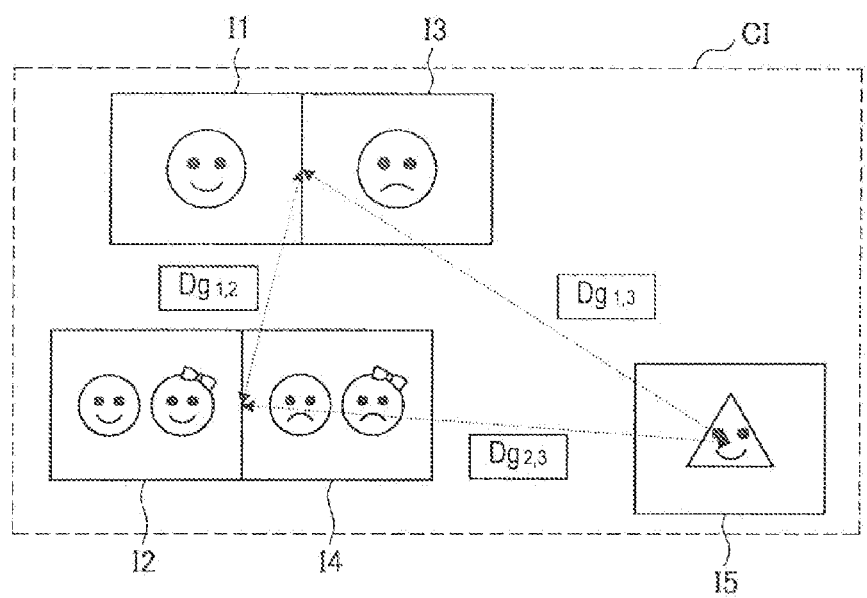

FIG.8

| CUT ID (GROUP ID) | 1 (1) | 2 (2) | 3 (1) | 4 (2) | 5 (3) | 6 (1) | 7 (2) |
|---|---|---|---|---|---|---|---|
| 1 (1) | — | 1 | 1/4 | 1/9 | 1/16 | 1/25 | 1/36 |
| 2 (2) |  | — | 1 | 1/4 | 1/9 | 1/16 | 1/25 |
| 3 (1) |  |  | — | 1 | 1/4 | 1/9 | 1/16 |
| 4 (2) |  |  |  | — | 1 | 1/4 | 1/9 |
| 5 (3) |  |  |  |  | — | 1 | 1/4 |
| 6 (1) |  |  |  |  |  | — | 1 |
| 7 (2) |  |  |  |  |  |  | — |

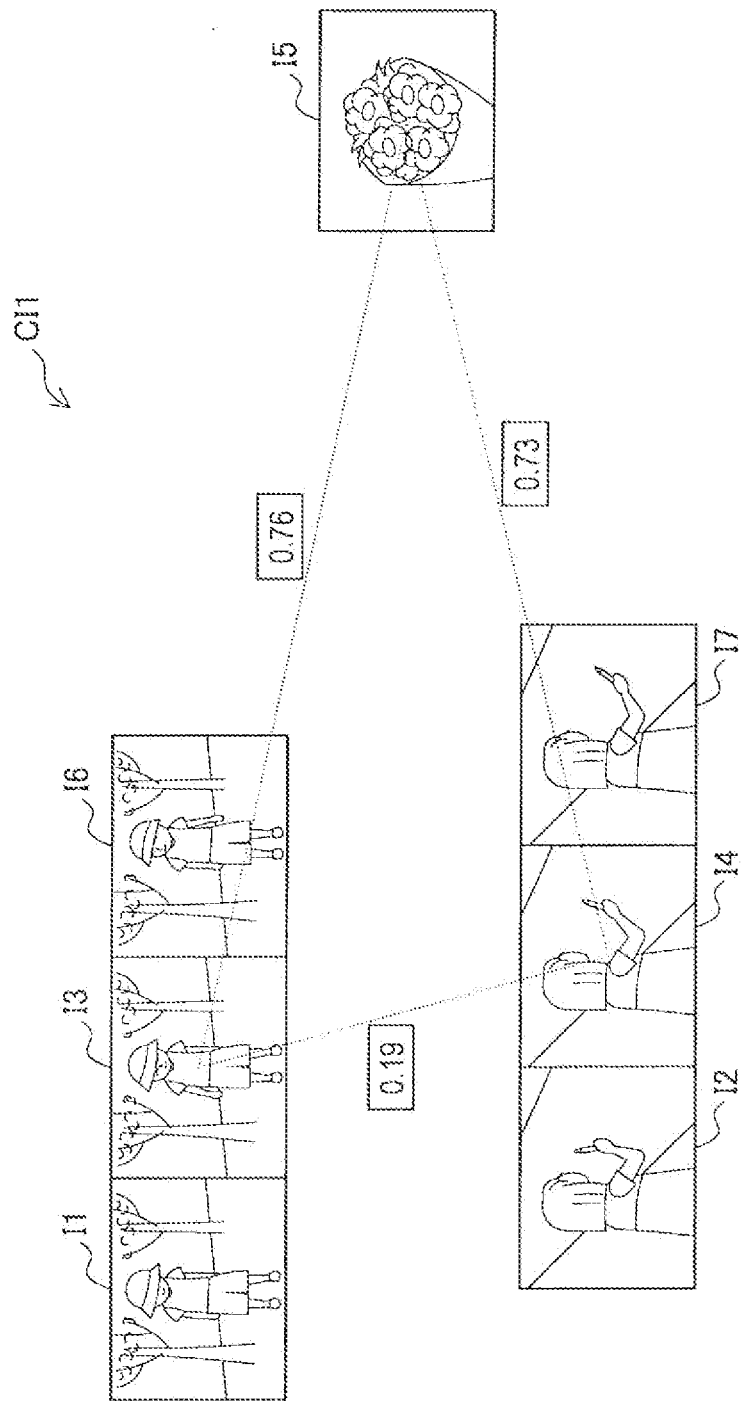

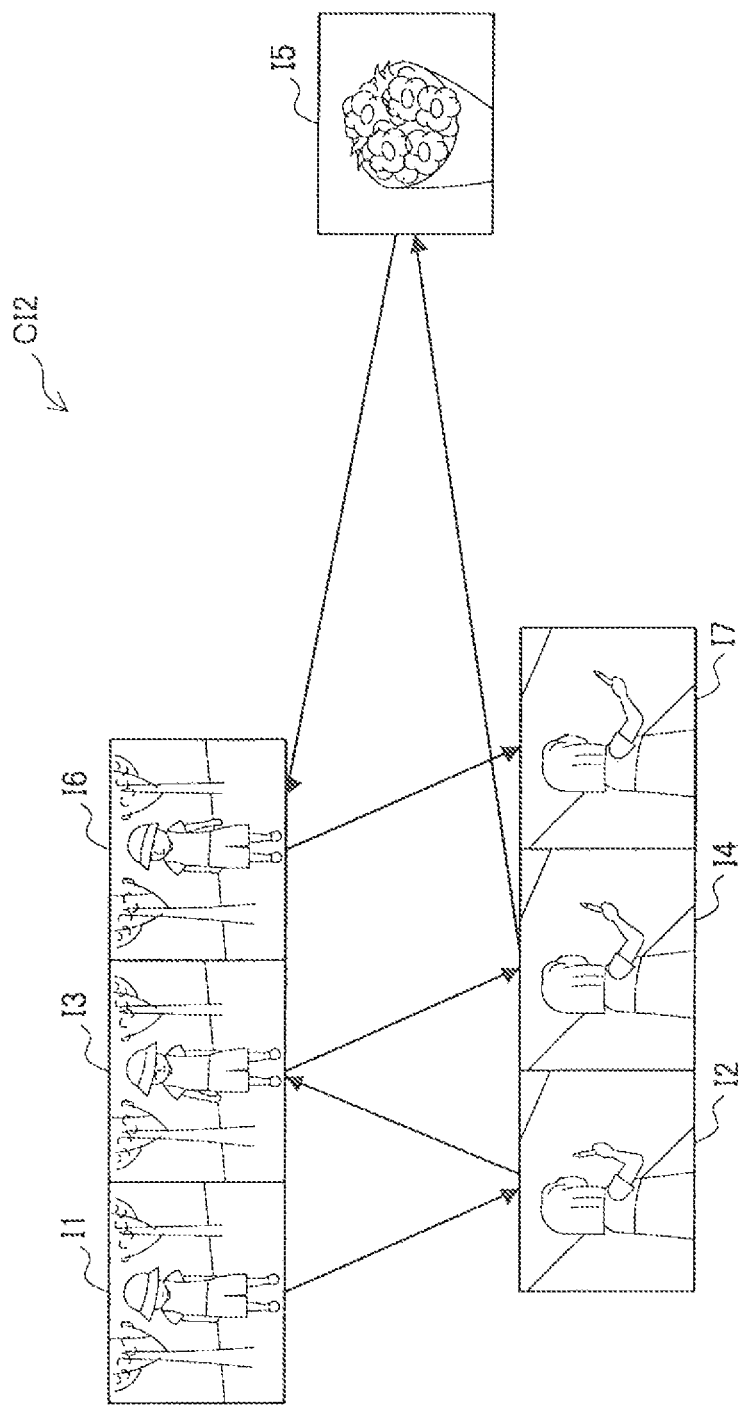

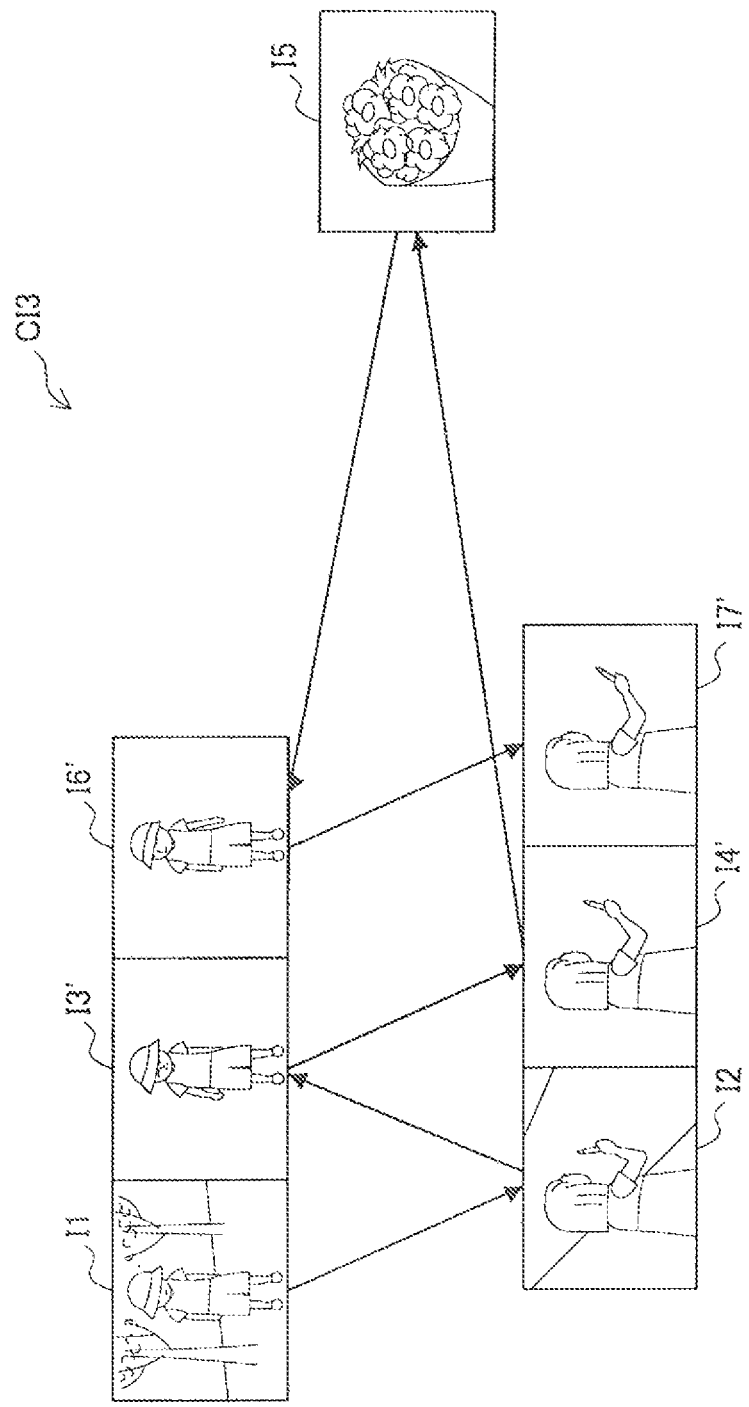

MOVING IMAGE PROCESSING APPARATUS, MOVING IMAGE PROCESSING METHOD, AND PROGRAM

BACKGROUND

The present disclosure relates to a moving image processing apparatus, a moving image processing method, and a program.

In general, a video (or a moving image) includes a plurality of cuts. In the related art, in order to understand the cut structure of a video, a moving image processing method has been disclosed to arrange and display thumbnails of the video chronologically at a constant frame interval. The moving image processing method can provide information on the object of a video.

SUMMARY

Further, in video expression, there is a case in which a cut structure is devised such as an arrangement of cuts with the same content at temporal intervals according to the intention of a maker. The moving image processing method in the related art provides the information on the object of the video, but does not sufficiently provide information on a method of capturing the object of the video, in other words, information on a method of expressing the video in relation to the temporal context of the video.

Meanwhile, there is a case in which the method of expressing the video in relation to the temporal context of the video may be important to a person who views a video or a person who uses the video as a material of other videos and the like. However, since it is not possible, for the moving image processing, method in the related art to sufficiently provide such information, a viewer or a user may not intuitively understand the cut structure of the video.

In light of the foregoing, it is desirable to provide a moving image processing apparatus, a moving image processing method, and a program, which enable the cut structure of a moving image tote easily understood.

According to an embodiment of the present disclosure, there is provided a moving image processing apparatus, including a cut transition detection unit configured to detect inter-cut transition from a moving image including a plurality of cuts, a cut grouping unit configured to group the plurality of cuts into cut groups based on a degree of similarity among the cuts, an inter-cut distance calculation unit configured to calculate inter-cut distances bated on inter-cut temporal distances in the moving image, an inter-cut group distance calculation unit configured to calculate inter-cut group distances by summing up the intercut distances, which are calculated with respect to the plurality of cuts, in each cut group, and a cut structure image generation unit configured, to generate a cut structure image including representative images of the cuts belonging to the cut groups and information indicating the inter-cut group distances.

When transition information indicating an order of the cut transition between a cut i and a cut j in the moving image is employed as $n_i$ and $n_j$ ($n_i<n_j$), the inter-cut distance calculation unit may calculate $(n_j-n_i)^a$ ($a\neq 0$), which is obtained from a difference value $(n_j-n_i)$ of the transition information $n_i$ and $n_j$, as the inter-cut distance, between the cut i and the cut j.

When transition information indicating timing of the cut transition between a cut i and a cut j in the moving image is employed as $n_i$ and $n_j$ ($n_i<n_j$), the inter-cut distance calculation unit may calculate $(n_j-n_i)^b$ ($b\neq 0$), which is obtained from a difference value $(n_j-n_i)$ of the transition information $n_i$ and $n_j$, as the inter-cut distance between the cut i and the cut j.

The transition information $n_i$ and $n_j$ may be an end frame number of the cut i and a start frame number of the cut j respectively, or an end lime frame of the cut i and a start time frame of the cut j respectively.

When transition information indicating an order of the cut transition of the cut transition between a cut i and a cut j in the moving image is employed as $n1_i$ and $n1_j$ ($n1_i<n1_j$), the inter-cut distance calculation unit may calculate $(n1_j-n1_i)^a$ ($a\neq 0$), which is obtained from a difference value $(n1_j-n1_i)$ of the transition information $n1_i$ and $n1_j$, as a first inter-cut distance between the cut i and the cut, j. When transition information indicating timing of the cut transition between the cut i and the cut j in the moving image is employed as $n2_i$ and $n2_j$ ($n2_i<n2_j$), the inter-cut distance calculation unit may calculate $(n2_j-n2_i)^b$ ($b\neq 0$), which is obtained from a difference value $(n2_j-n2_i)$ of the transition information $n2_i$ and $n2_j$, as a second inter-cut distance between the cut i and the cut j. The inter-cut distance calculation unit may calculate the inter-cut distance between the cut i and the cut j based on a polynomial equation employing the first inter-cut distance and the second inter-cut distance as terms.

The transition information $n2_i$ and $n2_j$ may be an end frame number of the cut i and a start frame number of the cut j respectively, or an end time frame of the cut i and a start time frame of the cut j respectively.

The cut structure image generation unit may generate the cut structure image in which sets of at least one representative image of at least one cut belonging to a cut group different among the sets are spaced apart from each other according to the inter-cut group distances.

The cut structure image generation unit may generate the cut structure image including information indicating an order of the cut transition.

When at least two cuts belong to the same cut group; in order to emphasize a changed part relative to the representative image of a reference cut of the cut group, the cut structure image generation unit may modify representative images of other cuts.

The inter-cut distance calculation unit may calculate the inter-cut distances from a reciprocal of transition information indicating the inter-cut temporal distances, and may calculate the inter-cut group distances from a reciprocal of a value obtained by summing up the inter-cut distances, which are calculated with respect to the plurality of cuts, in each cut group.

According to another embodiment of the present disclosure, there is provided a moving image processing method, including detecting inter-cut transition from a moving image including a plurality of cuts, grouping the plurality of cuts into cut groups based on a degree of similarity among the cuts, calculating inter-cut, distances based on inter-cut temporal distances in the moving image, calculating inter-cut group distances by summing up the intercut distances, which are calculated with respect to the plurality of cuts, in each cut group, and generating a cut structure image including representative images, of the cuts belonging to the cut groups and information indicating the inter-cut group distances.

According to yet another embodiment of the present disclosure, there is provided a program causing a computer to execute the moving image processing method. The program may be provided in a computer-readable medium or via means of communication and the like.

According to the embodiment of the present disclosure described above, it is possible to provide a moving image processing apparatus, a moving image processing method, and a program, which enable the cut structure of a moving image to be easily understood.

BRIEF DESCRIPTION OF THE DRAWINGS

FIG. 1 is a diagram explaining the overview of a moving image processing method according to an embodiment of the present disclosure;

FIG. 8 is a diagram illustrating calculation result of inter-cut distances in the cut structure illustrated in FIG. 4;

FIG. 10 is a diagram illustrating an example, of a cut structure image in the cut structure illustrated in FIG. 4;

FIG. 11 is a diagram illustrating a modified example of the cut structure image illustrated in FIG. 10; and FIG. 12 is a diagram illustrating another modified example of the cut structure image illustrated in FIG. 10.

DETAILED DESCRIPTION OF THE EMBODIMENT(S)

Figure 2:
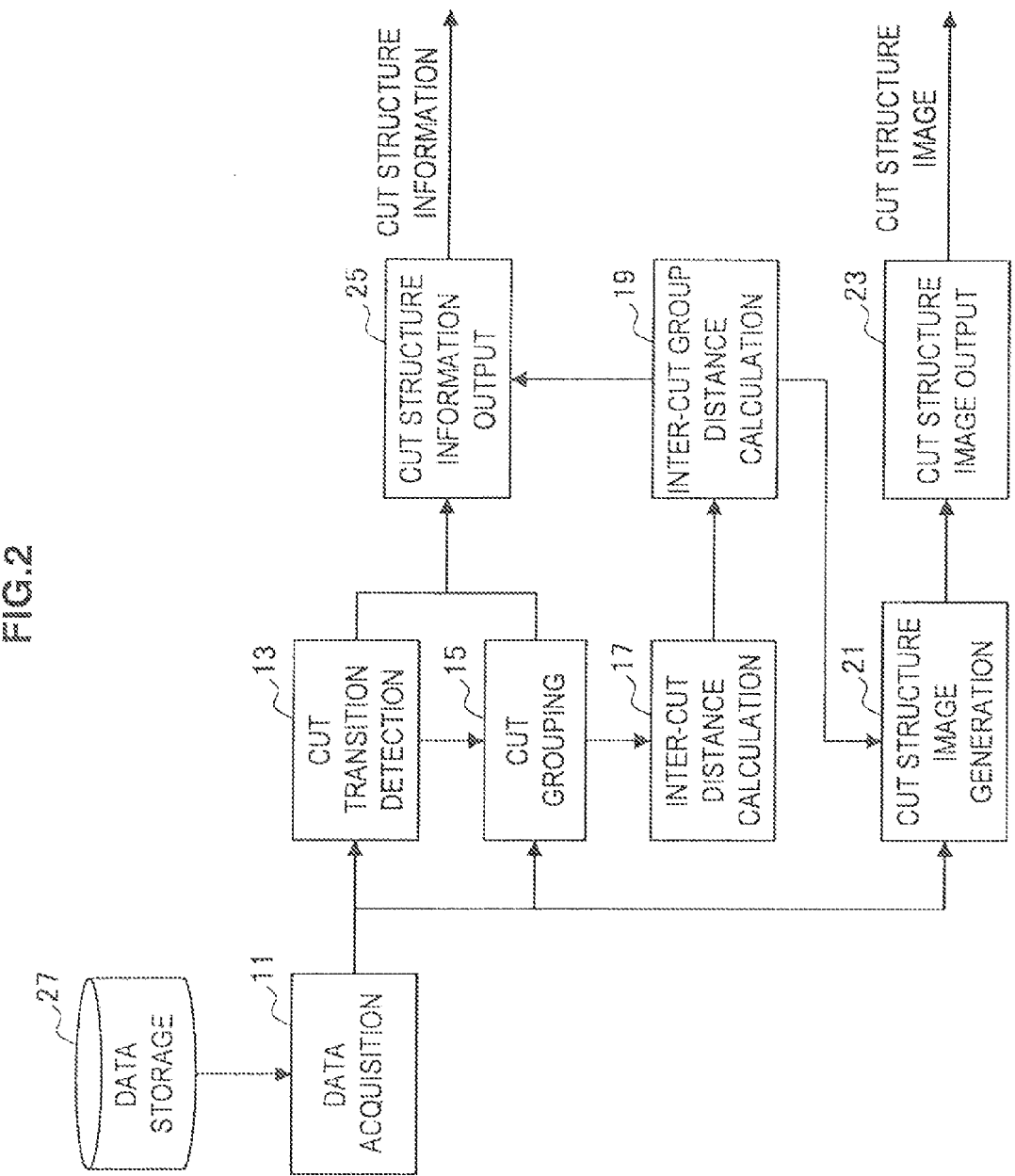
FIG. 2 is a block diagram illustrating the configuration of a moving image processing apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[I. Overview of Moving Image Processing Method]

First, the overview of the moving image processing method according to an embodiment of the present disclosure will be described with reference to FIG. 1. FIG. 1 illustrates the overview of the moving image processing method.

In the moving image processing method according to the embodiment of the present disclosure, inter-cut transition is first detected from a moving image MP including a plurality of cuts. Next; the plurality of cuts are grouped into cut groups based on the degree of inter-cut similarity. Then, inter-cut distances Dc (the general term for inter-cut distances) are calculated based on inter-cut temporal distances in the moving image MP, and inter-cut group distances Dg (the general term for inter-cut group distances) are calculated by summing up the inter-cut distances Dc, which are calculated with respect to the plurality of cuts, in each cut group.

Here, the inter-cut distance Dc indicates the degree of inter-cut correlation and the inter-cut group distance Dg indicates the degree of inter-cut group correlation. Then, both representative images I (the general term for representative images) of cuts belonging to a cut group, and a cut structure image CI including information indicating the inter-cut group distance Dg are generated. The cut structure image CI is output through a moving image processing apparatus 1, which will be described later, and an external apparatus as information for easily understanding the cut structure of the moving image MP.

In the example illustrated in FIG. 1, the moving image MP includes cuts 1 and 2, a cut 3 similar to the cut 1, a cut 4 similar to the cut 2, and a cut 5 that is not similar to any of the cuts 1 to 4. In the cuts 1 to 5, based on the degree of inter-cut similarity, the cuts 1 and 3 are grouped into a cut group 1, the cuts 2 and 4 are grouped into a cut group 2, and the cut 5 is grouped into a cut group 3.

Among the cuts 1 to 5, inter-cut distances $Dc_{1,2}$, $Dc_{1,3}$, ..., $Dc_{4,5}$ are calculated based on inter-cut temporal distances, and inter-cut group distances $Dg_{1,2}$, $Dg_{1,3}$ and $Dg_{2,3}$ are calculated by summing up the inter-cut distances $Dc_{1,2}$, $Dc_{1,3}$, ..., $Dc_{4,5}$, which are calculated with respect to the cuts 1 to 5, in each of the cut groups 1 to 3. Here, the inter-cut group distance Dg indicates the degree of inter-cut group, correlation. Therefore, it is possible to indicate the degree of correlation between the cut groups 1 and 2, the cut groups 1 and 3, and the cut groups 2 and 3 using the inter-cut, group distances $Dg_{1,2}$, $Dg_{1,3}$ and $Dg_{2,3}$.

Here, in the example illustrated in FIG. 1, the moving image MP includes the repetition of cuts including the cuts 1 and 2 and the cuts 3 and 4, and the cut 5 subsequent to the cut 4. Therefore, it is understood that strong correlation exists between the cut group 1 and the cut group 2 rather than the cut group 3 based on the repetition of cuts. Furthermore, it is understood that strong correlation exists between the cut group 3 and the cut group 2 rather than the cut group 1 based on the order of cut transition.

Thus, for example, when the inter-cut group distances Dg are calculated to be inversely proportional to the strength of the inter-cut group correlation, the inter-cut group distance $Dg_{1,2}$ between the cut groups 1 and 2 is calculated to be smaller than the inter-cut group distance $Dg_{1,3}$ between the cut groups 1 and 3. Furthermore, the inter-cut group distance $Dg_{2,3}$ between the cut groups 2 and 3 is calculated to be smaller than the inter-cut group distance $Dg_{1,3}$ between the cut groups 1 and 3.

In, the cut structure image CI, representative images I1 to I5 of the cuts 1 to 5 belonging to the cut groups 1 to 3 are spaced apart from one another by the inter-cut group distances Dg between the cut groups. Thus, it is possible to easily understand the degree of inter-cut group correlation. In addition, in FIG. 1, the inter-cut group distance Dg is indicated by numerical information. However, the numerical information may not be indicated.

In this way, information on a method of expressing a video in relation to the temporal context of the video is provided using the cut structure image CI. Consequently, a viewer or a user of the video views the video or uses the video as a material of other videos and the like, thereby easily understanding the cut structure of the video.

[2. Configuration of Moving Image Processing Apparatus 1]

Next, the moving image processing apparatus 1 according to the embodiment of the present disclosure will be described with reference to FIG. 2. FIG. 2 illustrates the main functional configuration of the moving image processing apparatus 1. As illustrated in FIG. 2, the moving image processing apparatus 1 includes a data acquisition unit 11, a cut transition detection unit 13, a cut grouping unit 15, an inter-cut distance calculation unit 17, an inter-cut group distance calculation unit 19, a cut structure image generation, unit 21, a cut structure, image output unit 23, a cut structure information output unit 25, and a data storage unit 27.

The data acquisition unit 11 acquires moving image data MP including a plurality of cuts, and supplies the moving image data MP to the cut transition detection unit 13, the cut grouping unit 15, and the cut structure image generation unit 21. In general, the moving image data MP is data in a frame format, and may be only image data or a combination of image data and voice data. The moving image data MP may be acquired from the data storage unit 27 or an external apparatus (not shown).

The cut transition detection unit 13 detects cut transition in the moving image data MP and supplies a detection result to the cut grouping unit 15. The cut transition represents a change in cuts in a moving image MP. The cut transition is detected based on the degree of similarity of the feature amounts of images and/or voice in frames in succession. As the feature amounts of the images and/or the voice, a color histogram and facial image detection, and/or the volume, tone/rhythm and the like of voice can be used. In addition, the detection, result of the cut transition may be supplied to the cut structure information output unit 25, the data storage unit 27, an external apparatus and the like, in addition to the cut grouping unit 15. Furthermore, feature amounts obtained when detecting the cut transition may be stored, in the data storage unit 27 and the like and used for other processes.

After detecting the cut transition, the cut transition detection unit 13 assigns transition information indicating the order of the cut transition in the moving image MP and cut transition information indicating the timing of the cut transition to cuts. The transition information indicating the order of the cut transition is cut numbers (cut IDs) and the like, and the transition information indicating the timing of the cut transition, for example, is frame numbers and time codes. The frame numbers and time codes may be extracted from the moving image data MP or generated based on the moving image data MP. The cut transition information is supplied to the cut grouping unit 15 together with the detection result of the cut transition. However, the cut transition information may be supplied to the data storage unit 27, the external apparatus and the like.

The cut grouping unit 15 groups the plurality of cuts into cut groups based on the degree of inter-cut similarity, which will be described in detail later. A cut grouping result is supplied to the inter-cut distance calculation unit 17 together with the detection result of the cut transition. However, the cut grouping result may be supplied to the cut structure information output unit 25, the data storage unit 27, the external apparatus and the like. The degree of inter-cut similarity is calculated from a color histogram of images and/or voice included in the cuts and a detection result of a facial image, and/or feature amounts S (the general term for feature amounts) of cuts including the volume, tone/rhythm and the like of the voice. The cut group represents a combination of cuts with similar feature amounts S. The cut grouping unit 15 assigns group IDs representing cut groups to the cuts based on the cut grouping result.

The inter-cut distance calculation unit 17 calculates the inter-cut distances Dc based on the cut transition information, which will be described later. The inter-cut distances Dc are calculated based on the inter-cut temporal distances in the moving image MP in order to indicate the degree of inter-cut correlation. A calculation result of the inter-cut distances Dc is supplied to the inter-cut group distance calculation unit 19. However, the calculation result of the inter-cut distances Dc may supplied to the data storage unit 27, the external apparatus and the like.

The inter-cut group distance calculation unit 19 calculates the inter-cut group distances Dg based on the calculation result of the inter-cut distances Dc, which will be described later. The inter-cut group distances Dg are calculated by summing up the inter-cut distances Dc, which are calculated with respect to the plurality of cuts, in each cut group in order to indicate the degree of inter-cut group correlation. A calculation result of the inter-cut group distances Dg is supplied to the cut structure image generation unit 21. However, the calculation result of the inter-cut group distances Dg may be supplied to the cut structure information output unit 25, the data storage unit 27, the external apparatus and the like.

In order to generate the cut structure image CI, the cut structure image generation unit 21 extracts a representative image I from images included in each cut based on the moving image data MP and the detection result of the cut transition according to predetermined standards. The representative image I is an image representing each cut, and for example, is extracted as an image corresponding to the center frame of the cut. The cut structure image CI is generated as an image including representative images I of the cuts belonging to the cut groups and information indicating the inter-cut group distances Dg.

The cut structure, image output unit 23 outputs the cut structure image CI supplied from the cut structure image generation unit 21 such that a user can easily understand the cut structure of the moving image MP. The cut structure image CI may be output to a display apparatus, a printing apparatus, a storage apparatus, or an external apparatus (not shown) connected to the moving image processing apparatus 1.

The cut structure information output unit 25 outputs the calculation result of the inter-cut distances Dc and/or the inter-cut group distances Dg, and the like, as cut structure information such that a user can use the cut structure information to understand the cut structure. The cut structure information may be output to the display apparatus, the printing apparatus, the storage apparatus, or the external apparatus (not shown), which is connected to the moving image processing apparatus 1.

The cut structure information can be used as data for performing a moving image search considering the cut structure. For example, a certain cut can be used as a reference cut and a cut with strong correlation with the reference cut can be searched, or a cut group including a certain cut can be, used as a reference cut group and a cut group with strong correlation with the reference cut group can be searched. Furthermore, it is possible to search the moving image MP including a set of cut groups with strong correlation with one another.

The data storage unit 27 stores the moving image data MP and data belonging to the moving image data MP. The data storage unit 27 may store the cut structure information, such as the detection result of the cut transition, the cut grouping result, and the calculation results of the inter-cut distances Dc and the inter-cut group distances Dg, and the cut structure image CI, which are associated with the moving image data MP. In addition, in FIG. 2, a part of a connection relationship between the data storage unit 27 and other elements is omitted.

Here, in the functional configuration, the data acquisition unit 11, the cut transition detection unit 13, the cut grouping unit 15, the inter-cut distance calculation unit 17, the inter-cut group distance calculation unit 19, the cut structure image generation unit 21, the cut structure image output unit 23, and the cut structure information output unit 25 include, an arithmetic processing unit such, as a CPU or a digital signal processing apparatus (DSP). The data storage unit 27 includes an internal storage device such as a flash memory, or an external storage device such as a hard disk drive or a Blu-ray disc drive. The CPU develops and executes a program read from a ROM, and the like on a RAM, thereby performing the moving image processing method. In addition, at least a part of the functional configuration may be realized by hardware such as a dedicated logic.

[3. Operation of Moving Image Processing Apparatus 1]

Figure 3:
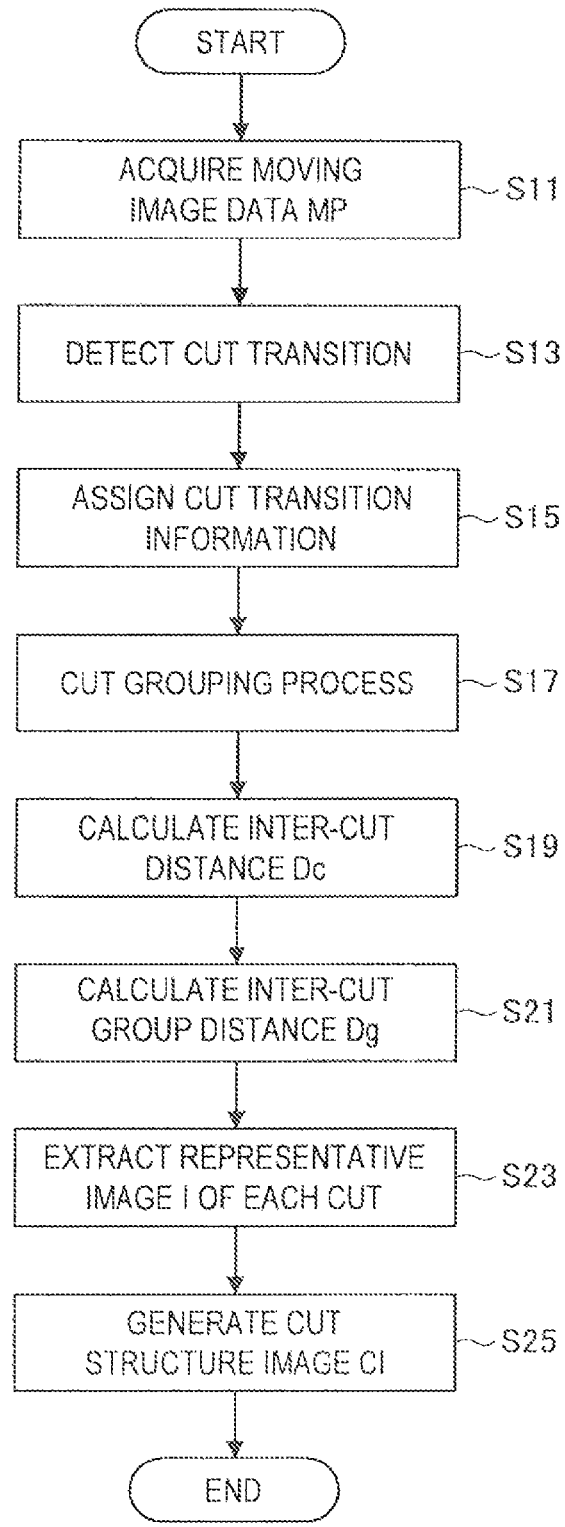
FIG. 3 is a flowchart illustrating the operation procedure of moving image processing apparatus.

Next, the operation of the moving image processing apparatus 1 according to the embodiment of present disclosure will be described with reference to FIGS. 3 to 12. FIG. 3 illustrates the operation procedure of the moving image processing apparatus 1.

As illustrated in FIG. 3, the data acquisition unit 11 first acquires moving image data MP (step S11) and supplies the moving image data MP to the cut transition detection unit 13 and the like. The cut transition detection unit 13 detects cut transition in a moving image MP based on the moving image data MP (step S13), and supplies the detection result to the cut grouping unit 15. The cut transition is detected based on the feature amounts of images and/or voice in frames in succession. Cut transition information such as cut IDs, frame numbers and time codes is assigned to each cut (step S15). In addition, hereinafter, the case in which the cut IDs indicating the order of cut transition in the moving image MP are used as the cut structure information will be mainly described.

Figure 4:
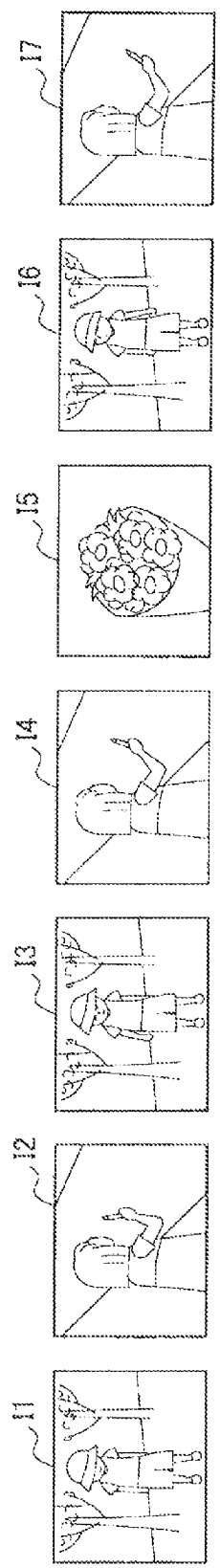
FIG. 4 is a diagram illustrating an example of a cut structure.

FIG. 4 illustrates an example of a cut structure obtained from the detection result of the cut transition. In order to facilitate understanding, FIG. 4 illustrates a cut structure using a representative image I of each cut. In addition, the representative images I are extracted by the cut structure image generation unit 21 from the moving image data MP as will be described later. As illustrated in FIG. 4, cuts 1, 3 and 6 are similar to one another, cuts 2, 4 and 7 are similar to one another, and a cut 5 is not similar to any of the cuts 1 to 4, 6 and 7.

Figure 5:
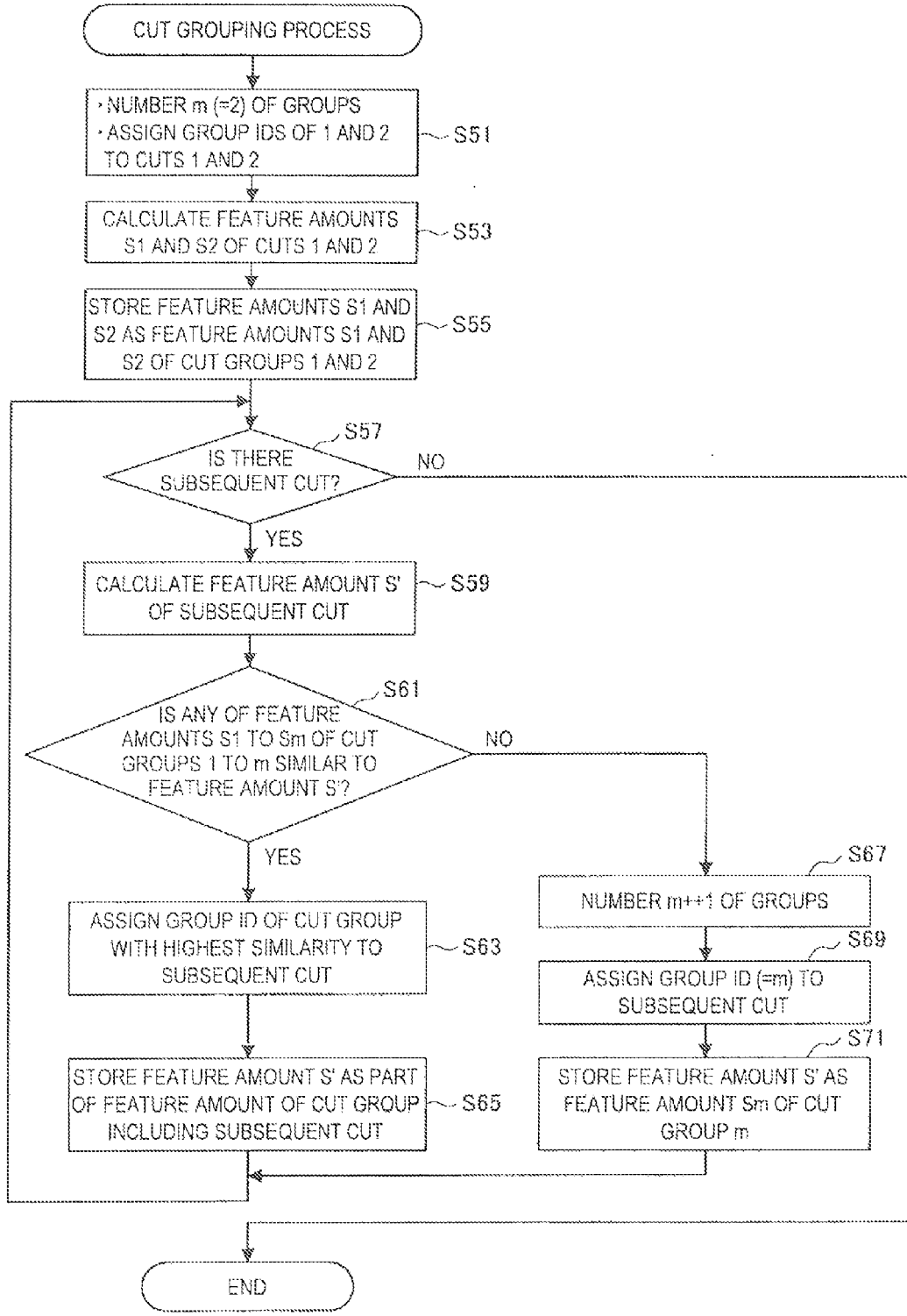
FIG. 5 is a flowchart illustrating the procedure of a cut grouping process.

Next, the cut grouping unit 15 performs a eta grouping process for grouping the cuts into cut groups (step S17). FIG. 5 illustrates the procedure of the cut grouping process. As illustrated in FIG. 5, in the cut grouping process, an initialization process is first performed (step S51). In the initialization process, the number m of groups is initialized. Furthermore, a group ID of 1 is assigned to the cut 1 and a group ID of 2 is assigned to the cut 2. Here, the number m of groups indicates the number of cut groups (cut groups 1 and 2 are specified in the initialization process) specified from the moving image data MP. The group ID is assigned to each cut in order to represent a cut group to which each cut belongs.

Then, feature amounts S1 and S2 of the cuts 1 and 2 are calculated (step S53) and stored in the data storage unit 27 and the like as the feature amounts S1 and S2 of the cut groups 1 and 2 (step S55). The feature amounts of the cut, for example, are calculated as a color histogram and facial image detection, and/or the volume, tone/rhythm and the like of voice, or a combination thereof.

Next, the presence or absence of a subsequent cut to be processed is checked (step S57). When the subsequent cut is present ("Yes" in step S57), the feature 'amounts S' of the subsequent cut are calculated (step S59), and the similarity of the feature amounts S is determined between the subsequent cut and cut groups 1 to m (step S61). Here, when performing the determination, the degree of similarity of the feature amounts S may be preferentially determined between the subsequent cut and a cut group with a group ID larger than that of an immediately previous cut. This is because the group ID of a cut group including the subsequent cut is larger than that of the immediately previous cut when the repetition of cuts is performed.

When the degree of similarity of the feature amounts S is equal to or more than a predetermined threshold value between the subsequent cut and any of the cut groups 1 to m ("Yes" in step S61), the group ID of a cut group with the highest similarity is assigned to the subsequent cut (step S63). The feature amounts S' of the subsequent cut may be stored as a part of the feature-amounts S of the cut group including the subsequent cut, and then used (step S65) or discarded.

Meanwhile, when the degree of similarity of the feature amounts S is smaller than the predetermined threshold value between the subsequent cut and all the cut groups 1 to m ("No" in step S61), the number m of the groups is incremented by 1 in order to generate a new cut group (step S67). A group ID corresponding to the number m of the groups is assigned to the subsequent cut as the new cut group (step S69). The feature amounts S of the subsequent cut is stored as the feature amounts Sm of the new cut group including the subsequent cut, and then used (step S71).

The processes of steps S57, S59, S61, S63, S65, S67, S69 and S71 are repeated until there is no subsequent, cut, ("No" in step S57). When there is no subsequent cut, the cut grouping process ends, and the process of the next step S19 is performed as illustrated in FIG. 3. The cut grouping unit 15 supplies the cut grouping result to the inter-cut distance calculation unit 17 together with the detection result of the cut transition.

Figure 6:
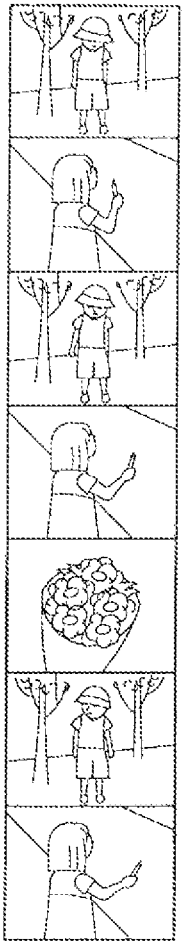
FIG. 6 is a table illustrating the result of a cut grouping process in the cut structure illustrated in FIG. 4.

FIG. 6 illustrates the result of the cut grouping process in the cut structure illustrated in FIG. 4. As illustrated in FIG. 6, a group ID of 1 is assigned to the cuts 1, 3 and 6, a group ID of 2 is assigned to the cuts 2, 4 and 7, and a group ID of 3 is assigned to the cut 5 based on the degree of similarity of the feature amounts S of each cut.

Figure 7A:
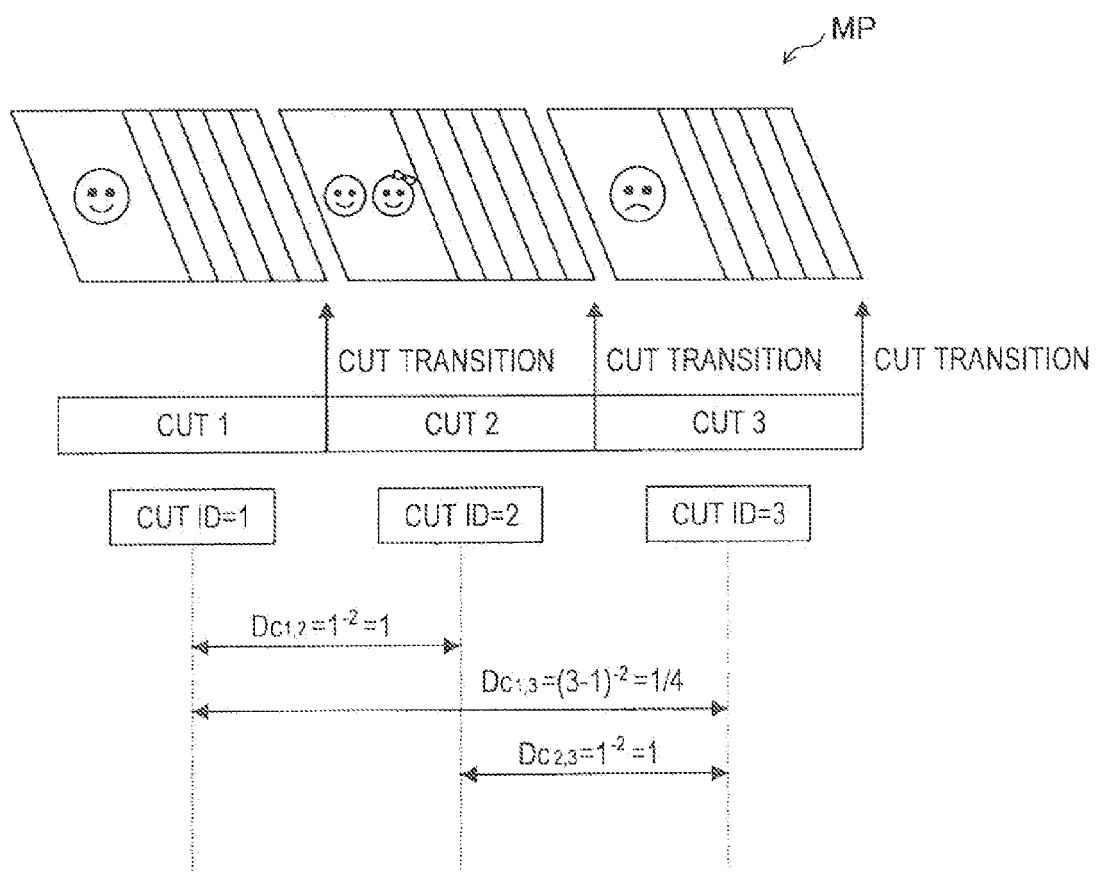
FIG. 7A is a diagram illustrating an example, of a calculation procedure of inter-cut distances.
Figure 7B:
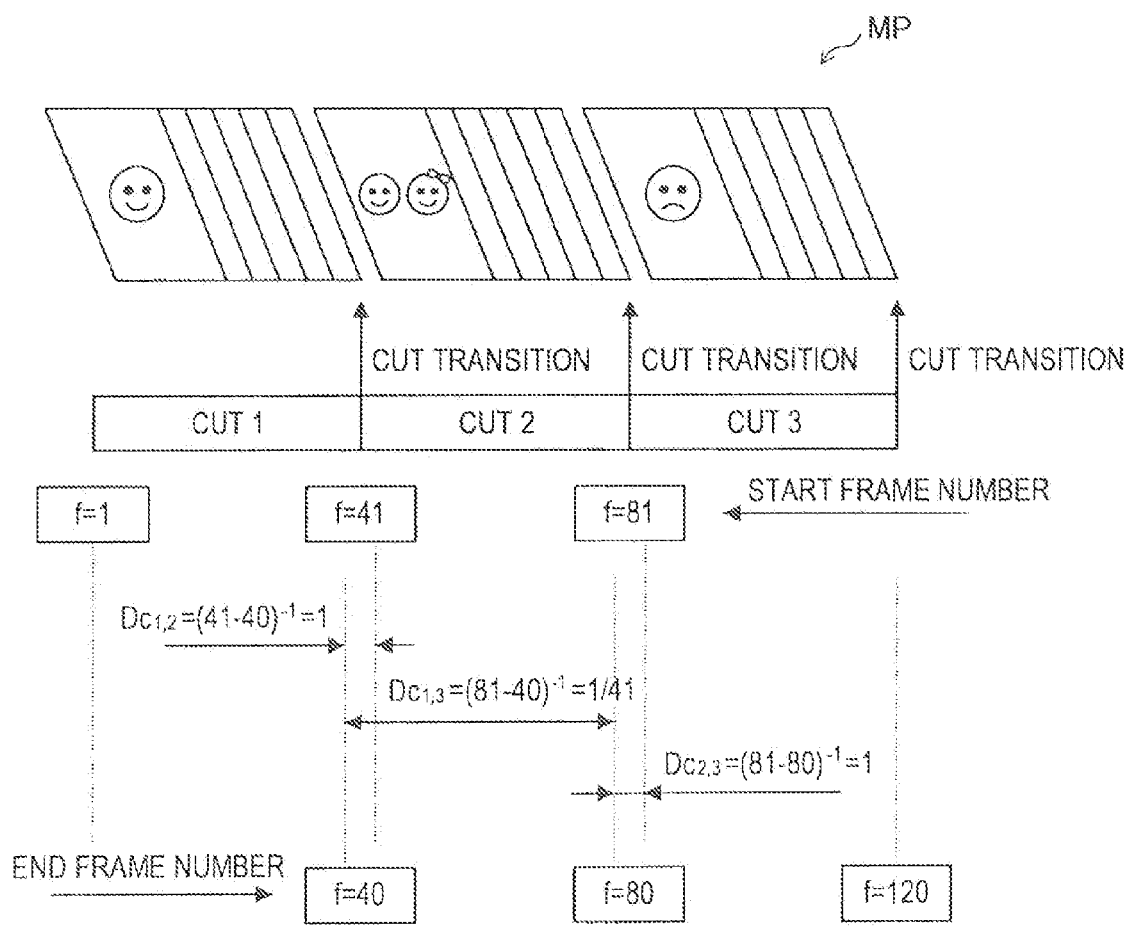
FIG. 7B is a diagram illustrating another example of a calculation procedure of inter-cut distances.
Figure 7C:
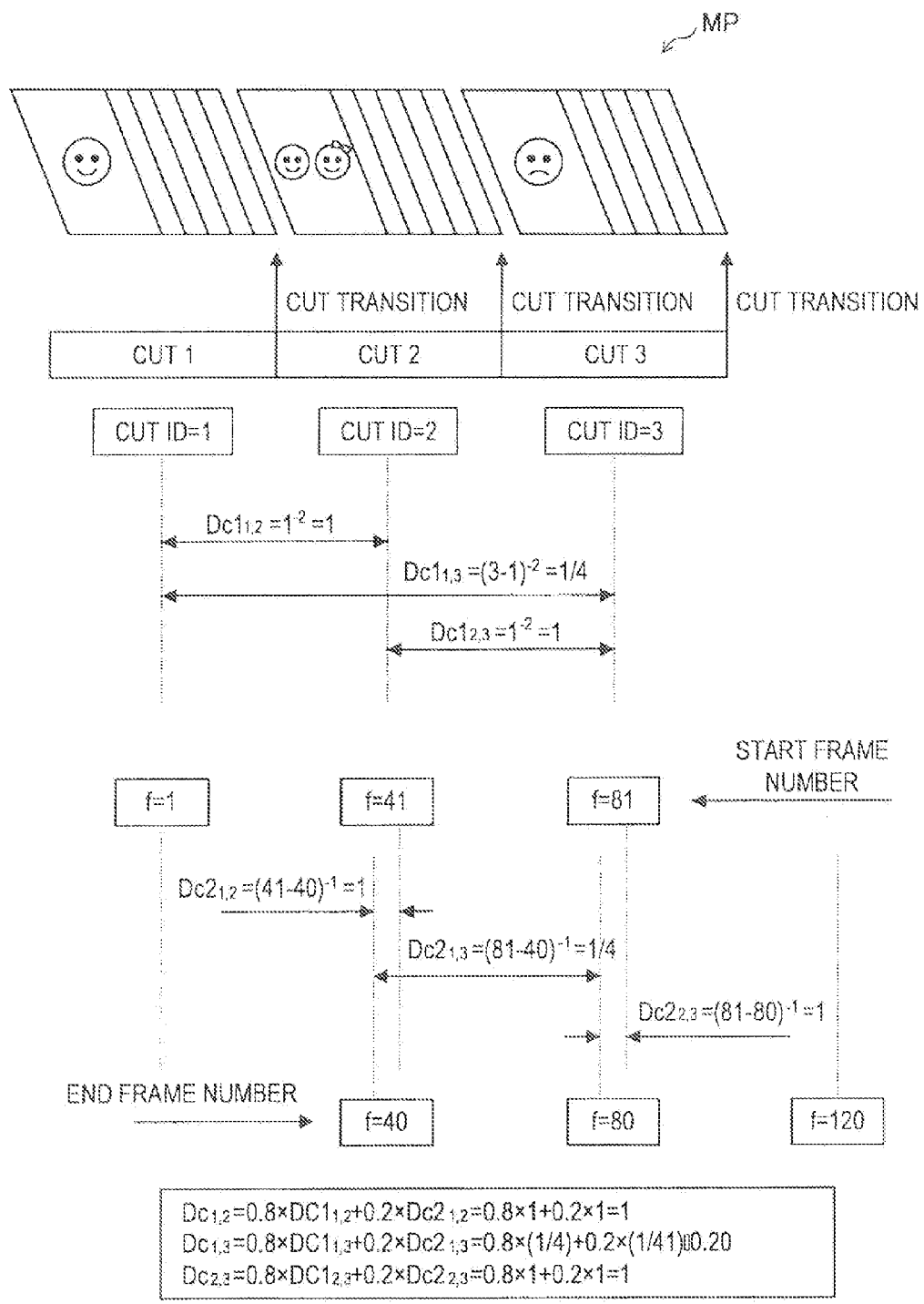
FIG. 7C is a diagram illustrating another example of a calculation procedure of inter-cut distances.

The inter-cut distance calculation unit 17 calculates the inter-cut distances Dc based on the cut transition information (step S19) and supplies the calculation result to the inter-cut group distance calculation unit 19. FIGS. 7A to 7C illustrate the procedure of calculating the inter-cut distances Dc with respect to a moving image MP including cuts 1 to 3 using various pieces of cut transition information.

First, in FIG. 7A, cut IDs indicating the order of cut transition in the moving image MP are used as cut transition information. As illustrated in FIG. 7A, cut IDs of 1 to 3 are assigned to the cuts 1 to 3, respectively.

First, a difference value $(n_j-n_i)$ $(n_i<n_j)$ between the cut ID of $n_i$ of a cut i and the cut ID of $n_j$ of a cut j is obtained. Next, a power value $(n_j-n_i)^a$ $(a \neq 0)$ of the difference value $(n_j-n_i)$ is calculated as an inter-cut distance $Dc_{i,j}$ between the cuts i and j.

The power index a is set to arbitrary integers other than 0 or real numbers. Here, between cuts in which cut transition is made in a similar order in the moving image MP, the inter-cut distances Dc are short when the power index a is smaller than 0, and are long when the power index a is larger than 0. Hereinafter, the case in which a=−2 will be described.

For example, the inter-cut distance $Dc_{1,2}$ between the cuts 1 and 2 is calculated as 1 because the difference value between the cut IDs is 1 (=2−1). Furthermore, the inter-cut distance $Dc_{1,3}$ between the cuts 1 and 3 is calculated as ¼ ($=2^{-2}$) because the difference value between the cut IDs is 2 (=3−1). In the same manner, the inter-cut distance $Dc_{2,3}$ between the cuts 2 and 3 is calculated as 1.

Furthermore, in FIG. 7B, frame numbers indicating the timing of cut transition in the moving image MP are used as cut transition information. As illustrated in FIG. 7B, a start frame number and an end frame number are assigned to the cuts 1 to 3, respectively. For example, 1 and 40 are assigned as the start frame number and the end frame number of the cut 1, 41 and 80 are assigned as the start frame number and the end frame number of the cut 2, and 81 and 120 are assigned as the start frame number and the end frame number of the cut 3.

First, a difference value $(n_j-n_i)$ between the final frame number $n_i$ of a cut i and the start frame number $n_j$ $(n_i<n_j)$ of a cut j is obtained. Next, a power value $(n_j-n_i)^b$ ($b\neq 0$) of the difference value $(n_j-n_i)$ is calculated as an inter-cut distance $Dc_{i,j}$ between the cuts i and j.

The power index b is set to arbitrary integers other than 0 or real numbers. Here, between cuts in which cut transition is made in a similar timing in the moving image MP, the inter-cut distances Dc are short when the power index b is smaller than 0, and are long when the power index b is larger than 0. Hereinafter, the case in which b=−1 will be described.

For example, the inter-cut distance $Dc_{1,2}$ between the cuts 1 and 2 is calculated as 1 because the difference value between the frame numbers is 1 (=41−40). Furthermore, the inter-cut distance $Dc_{1,3}$ between the cuts 1 and 3 is calculated as 1/41 because the difference value between the frame numbers is 41 (=81−40). In the same manner, the inter-cut distance $DC_{2,3}$ between the cuts 2 and 3 is calculated as 1.

Here, as cut transition information indicating the timing of cut transition in the moving image MP, time frames may be used. In relation to the time frames, for example, 0 second and 40 seconds are assigned as the start, time frame and the end time frame of the cut 1, 40.05 seconds and 80 seconds are assigned as the start time frame and the end time frame of the cut 2, and 80.05 seconds and 120 seconds are assigned as the start time frame and the end time frame oldie cut 3. Similar to the case of the frame number, in the case of the time frame. It is possible to calculate the inter-cut distances Dc.

In addition, when the frame numbers and the time frames are used as the cut transition information, an inter-cut, distance Dc between continuous cuts may be significantly long or short as compared with an inter-cut distance Dc between other cuts (e.g., $Dc_{1,3}$ of 1/41 with respect to $Dc_{1,2}$ of 1 in the example of FIG. 7B). In such a case, it is preferable to appropriately adjust the inter-cut distance Dc between the continuous cuts. For example, the inter-cut distance Dc between the continuous cuts is employed as 1/2 (e.g., $Dc_{1,2}=Dc_{1,3}/2=1/82$) of an inter-cut distance Dc obtained with respect to cuts in which the number of frames or a time interval in the moving image MP is minimum.

Furthermore, in FIG. 7C, the cut IDs and the frame numbers are used as the cut transition information. As illustrated in FIG. 7C, a start frame number and an end frame number are respectively assigned to, the cuts 1 to 5 together with the cut IDs.

First, as illustrated in FIG. 7A, a first inter-cut distance Dc1 is calculated using the cut IDs. Next, as illustrated in FIG. 7B, a second inter-cut distance Dc2 is calculated using the frame numbers. Then, for example, an inter-cut distance Dc is calculated based on the following polynomial equation employing the first inter-cut distance Dc1 and the second inter-cut distance Dc2 as terms. In addition, weight coefficients w1 and w2 of the polynomial equation are appropriately set according to evaluation standards regarding the degree of emphasis of the order and timing of cut transition as inter-cut correlation.

$$Dc_{i,j}=w1\times Dc1_{i,j}+w2\times Dc2_{i,j}$$

For example, when w1=0.8 and w2=0.2, the inter-cut distance $Dc_{1,2}$ between the cuts 1 and 2=1 (=0.8×1+0.2×1), the inter-cut distance $Dc_{1,3}$ between the cuts 1 and 3≈0.20 (=0.8×1/4+0.2×1/41), and the inter-cut distance $Dc_{2,3}$ between the cuts 2 and 3=1 (=0.8×1+0.2×1).

FIG. 8 illustrates the calculation result of the inter-cut distances Dc in the cut structure illustrated in FIG. 4. As illustrated in FIG. 8, cut IDs 1 to 7 are assigned to cuts 1 to 7, respectively. A group ID of 1 is assigned to the cuts 1, 3 and 6, a group ID of 2 is assigned to the cuts 2, 4 and 7, and a group ID of 3 is assigned to the cut 5 based on the degree of similarity of the feature amounts S of each cut. In FIG. 8, the cut IDs are used as cut transition information. Furthermore, in order to calculate the inter-cut distance Dc, a power value a (=−2) is used.

According to the calculation result of the inter-cut distances Dc illustrated in FIG. 8, for example, among the inter-cut distances Dc between the cut 1 and the cuts 2 to 7, $Dc_{1,2}$ is calculated to 1, $Dc_{1,3}$ is calculated to 1/4, $Dc_{1,4}$ is calculated to 1/9, $Dc_{1,5}$ is calculated to 1/16, $Dc_{1,6}$ is calculated to 1/25, and $Dc_{1,7}$ is calculated to 1/36.

Referring to FIG. 3, the inter-cut group distance calculation unit 19 calculates the inter-cut group distances Dg based on the calculation result of the inter-cut distances Dc, and supplies the calculation result of the inter-cut group distances Dg to the cut structure image generation unit 21 (step S21).

Figure 9:
FIG. 9 is a diagram illustrating the calculation result of inter-cut group distances in the cut structure illustrated in FIG. 8.

FIG. 9 illustrates the calculation result of the inter-cut group distances Dg in the cut structure illustrated in FIG. 8. As illustrated in FIG. 9, the inter-cut group distances Dg are calculated by summing up the inter-cut distances Dc, which are calculated with respect to a plurality of cuts, in each cut group. In addition, in the example of FIG. 9, the inter-cut group distances Dg are calculated as the reciprocal of the sum value. However, the inter-cut group distances Dg may not be calculated as the reciprocal.

In the example of FIG. 9, the inter-cut group distance $Dg_{1,2}$ between the cut group 1 and the cut group 2 is calculated by summing up the inter-cut distances Dc between any of the cuts 1, 3 and 6 belonging to the cut, group 1 and any of the cuts 2, 4 and 7 belonging to the cut group 2, the inter-cut distances Dc among the cuts 1, 3 and 6, and the inter-cut distances Dc among the cuts 2, 4 and 7 as follows, and employing the reciprocal of the sum value.

$$Dg_{1,2} = \{(Dc_{1,2} + Dc_{1,4} + Dc_{1,7} + Dc_{2,3} + Dc_{2,6} + Dc_{3,4} +$$
$$Dc_{3,7} + Dc_{4,6} + Dc_{6,7}) + (Dc_{1,3} + Dc_{1,6} +$$
$$Dc_{3,6}) + (Dc_{2,4} + Dc_{2,7} + Dc_{4,7})\}^{-1}$$
$$= \{(1 + 1/9 + 1/36 + 1 + 1/16 + 1 + 1/16 + 1/4 + 1) +$$
$$(1/4 + 1/25 + 1/9) + (1/4 + 1/25 + 1/9)\}^{-1}$$
$$= (4.51 + 0.40 + 0.40)^{-1} \approx 0.19$$

In addition, the inter-cut group distances $Dg_{1,2}$ may be calculated as inter-cut distances Dc between any of the cuts 1, 3 and 6 belonging to the cut group 1 and any of the cuts 2, 4 and 7 belonging to the cut group 2 as follows.

$$Dg_{1,2} = \{(Dc_{1,2} + Dc_{1,4} + Dc_{1,7} + Dc_{2,3} +$$
$$Dc_{2,6} + Dc_{3,4} + Dc_{3,7} + Dc_{4,6} + Dc_{6,7})\}^{-1}$$
$$= \{(1 + 1/9 + 1/36 + 1 + 1/16 + 1 + 1/16 + 1/4 + 1)\}^{-1}$$
$$= (4.51)^{-1} \approx 0.22$$

Furthermore, the inter-cut group distance $Dg_{1,3}$ between the cut group 1 and the cut group 3 is calculated by summing up inter-cut distances Dc between any of the cuts 1, 3 and 6 belonging to the cut group 1 and the cut 5 belonging to the cut group 3 as follows. In the same manner, the inter-cut group distance $Dg_{2,3}$ between the cut group 2 and the cut group 3 is calculated by summing up inter-cut distances Dc between any of the cuts 2, 4 and 7 belonging to the cut group 2 and the cut 5 belonging to the cut group 3 as follows.

$$Dg_{1,3} = (Dc_{1,5} + Dc_{3,5} + Dc_{5,6})^{-1} = (1/16 + 1/4 + 1)^{-1} = 16/21 \approx 0.76$$

$$Dg_{2,3} = (Dc_{2,5} + Dc_{4,5} + Dc_{5,7})^{-1} = (1/9 + 1 + 1/4)^{-1} = 36/49 \approx 0.73$$

The moving image MP illustrated in FIG. 4 has a cut structure including the cut 1, the cut 2, the cut 3 similar to the cut 1, the cut 4 similar to the cut 2, the cut 5, the cut 6 similar to the cuts 1 and 3, and the cut 7 similar to the cuts 2 and 4. That is, the moving image MP illustrated in FIG. 4 includes the repetition of cuts including the cuts 1 and 2 and the cuts 3 and 4, and the cuts 6 and 7, and the cut 5 subsequent to the cut 4.

Therefore, it is understood that strong correlation exists between the cut group 1 including the cuts 1, 3 and 6 and the cut group 2 including the cuts 2, 4 and 7 based on the repetition of cuts. Furthermore, it is understood that strong correlation exists between the cut group 3 and the cut group 2 rather than the cut group 1 based on the order of cut transition.

In the calculation result illustrated in FIG. 9, correlation of the inter-cut group distance $Dg_{1,2}$<the inter-cut group distance $Dg_{2,3}$<the inter-cut group distance $Dg_{1,3}$ clearly exists among the cut groups 1 to 3. Here, when considering that the inter-cut group distances Dg are calculated to be inversely proportional to the strength of the inter-cut group correlation, the strength of the correlation among the cut groups 1 to 3 is reflected in the calculation result illustrated in FIG. 9.

After the inter-cut group distances Dg are calculated, as illustrated in FIG. 3, the cut structure image generation unit 21 first extracts a representative image I from images included in each cut based on the moving image data MP and the detection result of the cut transition according to predetermined standards (step S23). Next, a cut structure image CI including the representative images I of the cuts belonging to the cut groups and information indicating the inter-cut group distances Dg is generated (step S25).

FIG. 10 illustrates an example of the cut structure image CI in the cut structure illustrated in FIG. 4. In the cut structure image CI illustrated in FIG. 10, representative images I1, I3 and I6 of the cuts 1, 3 and 6 belonging to the cut group 1, representative images I2, I4 and I7 of the cuts 2, 4 and 7 belonging to the cut group 2, and a representative image I5 of the cut 5 belonging to the cut group 3 are arranged. Here, the representative images I belonging to the same cut group are collectively arranged in the transverse direction.

Sets of the representative images I of each cut group are spaced apart from each other by the inter-cut group distances Dg illustrated in FIG. 9. That is, the sets of the representative images I of each cut group are arranged such that the ratio among the distance between the cut groups 1 and 2:the distance between the cut groups 1 and 3:the distance between the cut groups 2 and 3, that is, $Dg_{1,2}:Dg_{1,3}:Dg_{2,3}=0.19:0.76:0.73$. Consequently, the cut groups with inter-cut group strong correlation are arranged adjacent to each other, so that it is possible to easily understand the inter-cut group correlation.

In addition, when the inter-cut group distances Dg are calculated to be proportional to the strength of the inter-cut group correlation, the sets of the representative images I of each cut group may be spaced apart from each other by the reciprocal of the inter-cut group distances Dg. Furthermore, the cut structure image CI may include numerical information indicating the inter-cut group distances Dg.

FIG. 11 illustrates a modified example of the cut structure image CI illustrated in FIG. 10. In the cut structure image CI illustrated in FIG. 11, information indicating the order of cut transition based on cut transition information is additionally provided to the cut structure image CI illustrated in FIG. 10. That is, arrows indicating the order of cut transition of cuts 1, 2, 3, 4, 5, 6, and 7 are additionally provided. Consequently, it is possible to easily understand the order of cut transition in the moving image MP together with the inter-cut group correlation.

FIG. 12 illustrates another modified example of the cut structure image CI illustrated in FIG. 10. In the cut structure image CI illustrated in FIG. 12, representative images I of some cuts belonging to the same cut group are modified, as compared with the cut structure image CI illustrated in FIG. 10. That is, in a cut group including two or more cuts, in order to emphasize a changed part relative to a representative image I of a reference cut of the cut group, representative images I of other cuts are modified.

Here, in the cut groups 1 and 2, the cut 1 is selected as a reference cut. For example, backgrounds, which correspond to non-changed parts, of representative images I3' and I6' of the cuts 3 and 6 are omitted in order to emphasize a changed part relative to the representative image I of the cut 1. Consequently, it is possible to easily understand the inter-cut correlation (a change in the content of a cut) in a cut group together with the order of cut transition in the moving image MP.

[4. Conclusion]

As described above, in accordance with the moving image processing apparatus 1 and the moving image processing method according to the embodiment of the present disclosure, the inter-cut distances Dc are calculated based on the inter-cut temporal distances in the moving image MP, and the inter-cut group distances Dg are calculated by summing up the inter-cut distances Dc, which are calculated with respect to a plurality of cuts, in each cut group. Then, the cut structure image CI including representative images I of cuts belonging to cut groups and information indicating the inter-cut group distances Dg is generated.

In this way, information on a method of expressing a video in relation to the temporal context of the video is provided using the cut structure image CI. Consequently, a viewer or a user of the video views the video or uses the video as a material of other videos and the like, thereby easily understanding the cut structure of the video.

It should be understood by those skilled in the art that various modifications, combinations, sub-combinations and alterations may occur depending on design requirements and other factors insofar as they are within, the scope of the appended claims or, the equivalents thereof.

The present disclosure contains subject matter related to that disclosed in Japanese Priority Patent Application JP 2010-179695 filed in the Japan Patent Office on Aug. 10, 2010, the entire content of which is hereby incorporated by reference.

What is claimed is:

1. A moving image processing apparatus comprising:
   a cut transition detection unit configured to detect inter-cut transition from a moving image of a video including a plurality of cuts;
   a cut grouping unit configured to group the plurality of cuts into cut groups based on a degree of similarity among the cuts;
   an inter-cut distance calculation unit configured to calculate inter-cut distances based on inter-cut temporal distances in the moving image;

an inter-cut group distance calculation unit configured to calculate inter-cut group distances by summing up the inter-cut distances, which are calculated with respect to the plurality of cuts, in each cut group; and a cut structure image generation unit configured to generate a cut structure image including representative images of the cuts belonging to the cut groups and information indicating the inter-cut group distances.

2. The moving image processing apparatus according to claim 1, wherein, when transition information indicating an order of the cut transition between a cut i and a cut j in the moving image is employed as $n_i$ and $n_j$ ($n_i < n_j$), the inter-cut distance calculation unit calculates $(n_j - n_i)^a$ ($a \neq 0$), which is obtained from a difference value $(n_j - n_i)$ of the transition information $n_i$ and $n_j$, as the inter-cut distance between the cut i and the cut j.

3. The moving image processing apparatus according to claim 1, wherein, when transition information indicating timing of the cut transition between a cut i and a cut j in the moving image is employed as $n_i$ and $n_j$ ($n_i < n_j$), the inter-cut distance calculation unit calculates $(n_j - n_i)^b$ ($b \neq 0$), which is obtained from a difference value $(n_j - n_i)$ of the transition information $n_i$ and $n_j$, as the inter-cut distance between the cut i and the cut j.

4. The moving image processing apparatus according to claim 3, wherein the transition information $n_i$ and $n_j$ is an end frame number of the cut i and a start frame number of the cut j respectively, or an end time frame of the cut i and a start time frame of the cut j respectively.

5. The moving image processing apparatus according to claim 1, wherein, when transition information indicating an order of the cut transition of the cut transition between a cut i and a cut j in the moving image is employed as $n1_i$ and $n1_j$ ($n1_i < n1_j$), the inter-cut distance calculation unit calculates $(n1_j - n1_i)^a$ ($a \neq 0$), which is obtained from a difference value $(n1_j - n1_i)$ of the transition information $n1_i$ and $n1_j$, as a first inter-cut distance between the cut i and the cut j, when transition information indicating timing of the cut transition between the cut i and the cut j in the moving image is employed as $n2_i$ and $n2_j$ ($n2_i < n2_j$), the inter-cut distance calculation unit calculates $(n2_j - n2_i)^b$ ($b \neq 0$), which is obtained from a difference value $(n2_j - n2_i)$ of the transition information $n2_i$ and $n2_j$, as a second inter-cut distance between the cut i and the cut j, and the inter-cut distance calculation unit calculates the inter-cut distance between the cut i and the cut j based on a polynomial equation employing the first inter-cut distance and the second inter-cut distance as terms.

6. The moving image processing apparatus according to claim 5, wherein the transition information $n2_i$ and $n2_j$ is an end frame number of the cut i and a start frame number of the cut j respectively, or an end time frame of the cut i and a start time frame of the cut j respectively.

7. The moving image processing apparatus according to claim 1, wherein the cut structure image generation unit generates the cut structure image in which sets of at least one representative image of at least one cut belonging to a cut group different among the sets are spaced apart from each other according to the inter-cut group distances.

8. The moving image processing apparatus according to claim 7, wherein the cut structure image generation unit generates the cut structure image including information indicating an order of the cut transition.

9. The moving image processing apparatus according to claim 7, wherein, when at least two cuts belong to the same cut group, in order to emphasize a changed part relative to the representative image of a reference cut of the cut group, the cut structure image generation unit modifies representative images of other cuts.

10. The moving image processing apparatus according to claim 1, wherein the inter-cut distance calculation unit calculates the inter-cut distances from a reciprocal of transition information indicating the inter-cut temporal distances, and calculates the inter-cut group distances from a reciprocal of a value obtained by summing up the inter-cut distances, which are calculated with respect to the plurality of cuts, in each cut group.

11. A moving image processing method comprising the steps of:

detecting inter-cut transition from a moving image of a video including a plurality of cuts;

grouping the plurality of cuts into cut groups based on a degree of similarity among the cuts;

calculating inter-cut distances based on inter-cut temporal distances in the moving image;

calculating inter-cut group distances by summing up the inter-cut distances, which are calculated with respect to the plurality of cuts, in each cut group; and generating a cut structure image including representative images of the cuts belonging to the cut groups and information indicating the inter-cut group distances.

12. A program embodied on a non-transitory computer readable medium causing a computer to execute a moving image processing method, the method comprising the steps of:

detecting inter-cut transition from a moving image of a video including a plurality of cuts;

grouping the plurality of cuts into cut groups based on a degree of similarity among the cuts;

calculating inter-cut distances based on inter-cut temporal distances in the moving image;

calculating inter-cut group distances by summing up the inter-cut distances, which are calculated with respect to the plurality of cuts, in each cut group; and generating a cut structure image including representative images of the cuts belonging to the cut groups and information indicating the inter-cut group distances.

* * * * *